United States Patent

Hiltz

[15] 3,666,672

[45] May 30, 1972

[54] HYDROGEN GENERATING COMPOSITIONS

[72] Inventor: Ralph H. Hiltz, Pittsburgh, Pa.

[73] Assignee: Mine Safety Appliances Company, Pittsburgh, Pa.

[22] Filed: Dec. 24, 1969

[21] Appl. No.: 888,035

Related U.S. Application Data

[63] Continuation-in-part of Ser. No. 631,858, Apr. 19, 1967, abandoned.

[52] U.S. Cl. ................................. 252/188, 23/210, 23/358, 44/7.5, 149/22, 149/36
[51] Int. Cl. .................................... C01b 1/03, B01j 7/00
[58] Field of Search ............. 252/188; 23/210, 358; 44/7.5; 149/22, 36

[56] References Cited

UNITED STATES PATENTS

| 3,000,712 | 9/1961 | Kilner | 23/358 |
| 3,323,878 | 6/1967 | Gunderloy | 23/358 |
| 3,375,087 | 3/1968 | Gunderloy | 23/358 |

*Primary Examiner*—Herbert B. Guynn
*Assistant Examiner*—Irwin Gluck
*Attorney*—Ronald H. Shakely

[57] ABSTRACT

An autogeneously combustible composition that liberates hydrogen on burning contains an alkali metal borohydride and a hydrazine sulfate in proportions such that there are between about 0.5 to 2 boron atoms for each nitrogen atom.

6 Claims, No Drawings

HYDROGEN GENERATING COMPOSITIONS

This application is a continuation-in-part of my co-pending application, Ser. No. 631,858, filed Apr. 19, 1967 and now abandoned.

This invention relates to compositions for producing hydrogen and more particularly to combustible compositions that on burning liberate hydrogen.

The compositions of this invention are autogeneously combustible, that is, the combustion is self-sustained once the compositions are ignited. In this respect, the compositions are similar to the well-known chlorate candle for producing oxygen and the compositions of this invention are generally used in the same manner to produce hydrogen as oxygen candles are used to produce oxygen; the compositions are placed in a container with suitable outlets and the ignition means, are ignited, and as combustion progresses the produced hydrogen is discharged from the container.

The new compositions are an intimate mixture of a finely divided alkali metal borohydride, $MBH_4$, where M is an alkali metal, and a hydrazine sulfate, suitably dihydrazine sulfate, $2(N_2H_4)\cdot H_2SO_4$, or monohydrazine sulfate, $N_2H_4\cdot H_2SO_4$, compressed to form a coherent compact. The proportions are such that there is between about one-half and 2 atoms, and preferably between about 1 and 1.25 B atom, for each hydrazine N atom. When ignited the compositions burn to liberate hydrogen with a flameless burning front travelling from the point of ignition. Ignition may be accomplished by conventional methods, such as with electric match, hot wire, or solid chemical heat sources.

Compositions with a B:N ratio of less than about 1:2 burn comparatively slowly apparently according to a different reaction mechanism as the gas produced is about 50 percent nitrogen and the yield of hydrogen is very low. Compositions with a B:N ratio greater than about 2:1 give a low hydrogen yield and self-sustaining combustion of the composition is not reliably obtained. The preferred compositions having a B:N ratio between about 1:1 and 1.25:1 burn reliably to produce a high yield of hydrogen of over 90 percent purity.

The examples set forth in TABLE 1 are illustrative of this invention:

TABLE 1

| Run | Composition NaBH$_4$ (g.) | Composition (N$_2$H$_4$)$_2$H$_2$SO$_4$ (g.) | B:N ratio | Burning rate (min./in.) | Non-condensible gas produced Liters, STP | Non-condensible gas produced Percent H$_2$ | Non-condensible gas produced Percent N$_2$ | Liters H$_2$/g. | Max. gas temp. (° C.) |
|---|---|---|---|---|---|---|---|---|---|
| 1 | 7.7 | 33.0 | 1:4 | 2.21 | 18.7 | 52 | 48 | 0.24 | 240 |
| 2 | 14.0 | 30.0 | 1:2 | 1.44 | 31.4 | 78 | 12 | 0.56 | >300 |
| 3 | 76 | 162 | 1:2 | ---- | 200 | 80 | 18 | 0.67 | ---- |
| 4 | 20 | 21.5 | 1:1 | 1.42 | 35.4 | 88 | 12 | 0.75 | 300 |
| 5 | 40 | 42.8 | 1:1 | 1.44 | 59.1 | 91 | 9 | 0.65 | 300 |
| 6 | 126 | 135 | 1:1 | ---- | 195 | 91 | 8 | 0.68 | ---- |
| 7 | 157 | 135 | 1.25:1 | ---- | 221 | 96+ | 3 | 0.73 | ---- |
| 8 | 26.1 | 14 | 2:1 | 2.12 | 22.7 | 91 | 9 | 0.51 | 260 |
| 9 | 28.0 | 12.0 | 2.5:1 | 2.54 | 19.5 | 91 | 9 | 0.44 | 90 |

In runs 1, 2, 4, 5, 8 and 9, the sodium borohydride and dihydrazine sulfate were mixed together and placed in a 1-½-inch i.d. steel tube and compacted under 60,000 pounds pressure with a 1-½-inch diameter manderel. The composition was ignited with a small amount of conventional pyrotechnic which was in turn ignited by an electric squib. The gas generated was discharged at substantially atmospheric pressure through a −78° C. cold trap, a gas-sampling cell and a wet test meter. Substantially no condensibles were collected, except in runs 1 and 9 in which the small amount of collected condensibles appeared to be aqueous ammonia solutions. In other runs, a hydrogen sulfide odor was observed. The gas collected in the gas sample cell was analyzed by infrared analysis. The gas temperature was measured by thermocouple adjacent the combustible composition. In runs 3, 6 and 7, the sodium borohydride and dihydrazine sulfate were compacted into a pellet at a pressure of 20,000 psig. and ignited by electrical squib in a container discharging through a gas sample cell and a wet test meter. In addition to the hydrogen and nitrogen shown in the table, the gas analysis showed a hydrogen sulfide content of 2 percent in run 3, 1 percent in run 6, and less than 1 percent in run 7.

In run 1, with a low B:N ratio, the gas produced contains 48 percent nitrogen and only 0.24 liters of hydrogen are produced per gram of combustible composition. It appears that this reaction is to a large extent a thermal decomposition reaction of the hydrazine salt, rather than a hydrogen producing reaction with the borohydride. Run 9 with a high B:N ratio burned slowly an at a very low temperature, the gas evolved reaching a maximum temperature of only 90° C. In some instances, compositions with the same proportion of ingredients would not burn completely, that is, the reaction is not sufficiently exothermic to reliably propogate a burning front through the entire length of the compact. If the presence of the minor amounts of hydrogen sulfide is undesirable for a particular application it can be readily removed by passing the generated gas through an absorbent bed or canister.

Similar results are obtained when monohydrazine sulfate is used in place of dihydrazine sulfate, except that the volume of gas produced per unit weight of composition is reduced. Other alkali metal borohydrides can be used in place of sodium borohydride with substantially the same effect.

The compositions of this invention are stable at ordinary temperatures, up to at least about 165° F. Pellets of this invention were stored in sealed containers at 165° F. for eight weeks with no evidence of gas evolution or other degradation. Compositions generating gases containing higher proportions of nitrogen are useful for underwater inflations, while those producing higher purity hydrogen are especially suitable for balloon filling or hydrogen welding in the field.

It will be recognized that these compositions should be ignited only in the absence of air or other oxidizing gases, suitably in closed containers having an operable discharge tube or opening, such as an opening closed by a rupturable diaphragm.

I claim:

1. A combustible composition stable at ordinary temperatures that when ignited burns to liberate hydrogen consisting essentially of a coherent compact of an intimate mixture of finely divided alkali metal borohydride and hydrazine sulfate, the proportions being such that there is between about 0.5 and 2 boron atoms for each nitrogen atom.

2. A composition according to claim 1 in which there is between about 1 and 1.25 boron atoms for each nitrogen atom.

3. A composition according to claim 1 in which the borohydride is sodium borohydride.

4. A composition according to claim 1 in which the hydrogen sulfate is dihydrazine sulfate.

5. A composition according to claim 2 consisting essentially of sodium borohydride and dihydrazine sulfate.

6. A method of generating hydrogen comprising the step of igniting a coherent compact consisting essentially of an intimate mixture of finely divided alkali metal borohydride and hydrazine sulfate, the proportions being such that there is between about 0.5 and 2 boron atoms for each nitrogen atom.

* * * * *